United States Patent
Krüger

[11] Patent Number: 5,451,029
[45] Date of Patent: Sep. 19, 1995

[54] VARIABLE VALVE CONTROL ARRANGEMENT

[75] Inventor: Hermann Krüger, Wolfsburg, Germany

[73] Assignee: Volkswagen AG, Wolfsburg, Germany

[21] Appl. No.: 71,654

[22] Filed: Jun. 2, 1993

[30] Foreign Application Priority Data

Jun. 5, 1992 [DE] Germany ............ 42 18 593.9

[51] Int. Cl.6 ............ F16K 31/52; F16K 31/122; F01L 1/04
[52] U.S. Cl. ............ 251/48; 123/90.12; 123/90.16; 123/90.66; 251/263
[58] Field of Search ............ 251/48, 54, 251, 263; 123/90.12, 90.14, 90.16, 90.65, 90.66

[56] References Cited

U.S. PATENT DOCUMENTS

| | | | |
|---|---|---|---|
| 1,427,111 | 8/1922 | Knudsen | 251/54 |
| 2,641,438 | 6/1953 | Arnold | 251/263 |
| 3,111,119 | 11/1963 | Bergmann | 251/263 |
| 4,312,494 | 1/1982 | Aoyama | 251/48 |
| 4,671,221 | 6/1987 | Geringer et al. | 123/90.12 |
| 4,889,084 | 12/1989 | Rembold | 123/90.12 |
| 4,889,085 | 12/1989 | Yagi et al. | 123/90.12 |
| 4,982,706 | 1/1991 | Rembold | 123/90.12 |
| 5,113,811 | 5/1992 | Rembold et al. | 123/90.12 |
| 5,113,812 | 5/1992 | Rembold et al. | 123/90.12 |
| 5,165,369 | 11/1992 | Rembold et al. | 123/90.12 |
| 5,203,535 | 4/1993 | Richeson et al. | 251/48 |

FOREIGN PATENT DOCUMENTS

| | | | |
|---|---|---|---|
| 2453974 | 12/1980 | France | 123/90.12 |
| 2517370 | 10/1976 | Germany | 123/90.12 |
| 3815668 | 11/1989 | Germany . | |
| 0121317 | 9/1979 | Japan | 123/90.12 |
| 0142414 | 11/1979 | Japan | 123/90.12 |
| 231115 | 2/1944 | Switzerland | 251/263 |

*Primary Examiner*—George L. Walton
*Attorney, Agent, or Firm*—Brumbaugh, Graves, Donohue & Raymond

[57] ABSTRACT

A variable valve control arrangement for a lift valve of an internal combustion engine has a longitudinally adjustable coupling assembly disposed between a cam and the lift valve including an outer cup plunger and an inner plunger on the lift valve side and a hydraulic working space formed between the plungers. During the flanks of the valve lift curve, communication is established at times between the hydraulic working space and a pressure medium supply through the cup plunger so that at sufficiently high pressure the coupling assembly will increase its length. During the valve closing phase, the pressure in the working space is reduced through a throttle aperture in the cup plunger.

9 Claims, 4 Drawing Sheets

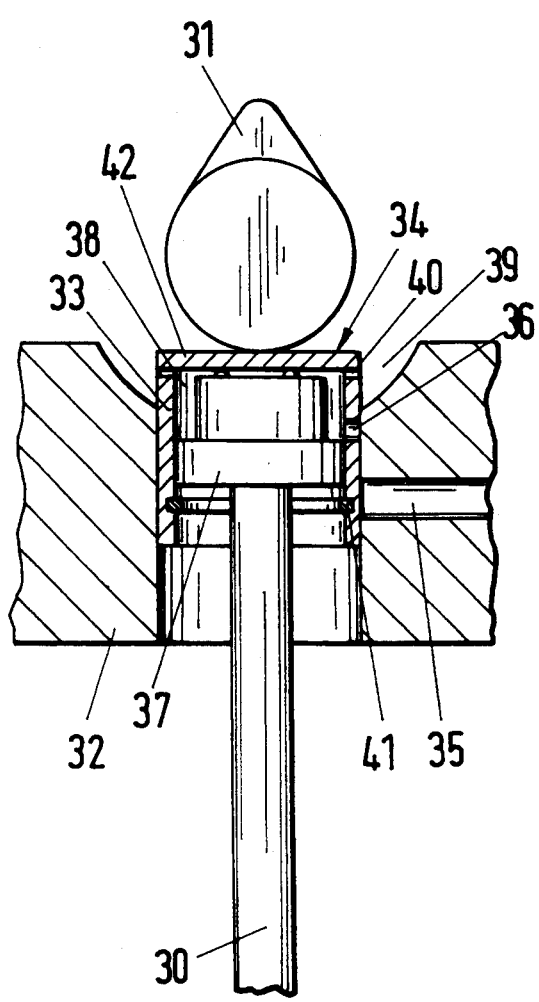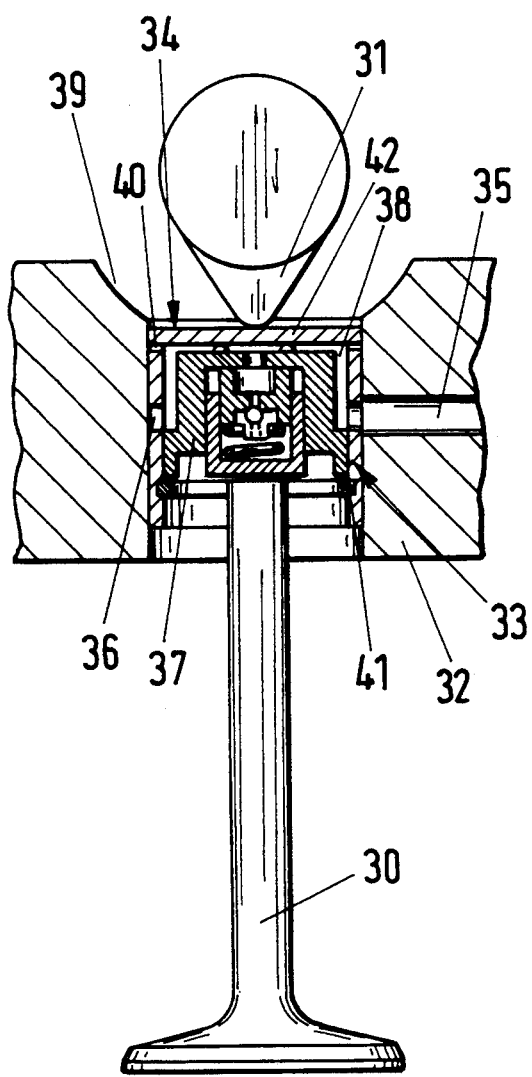

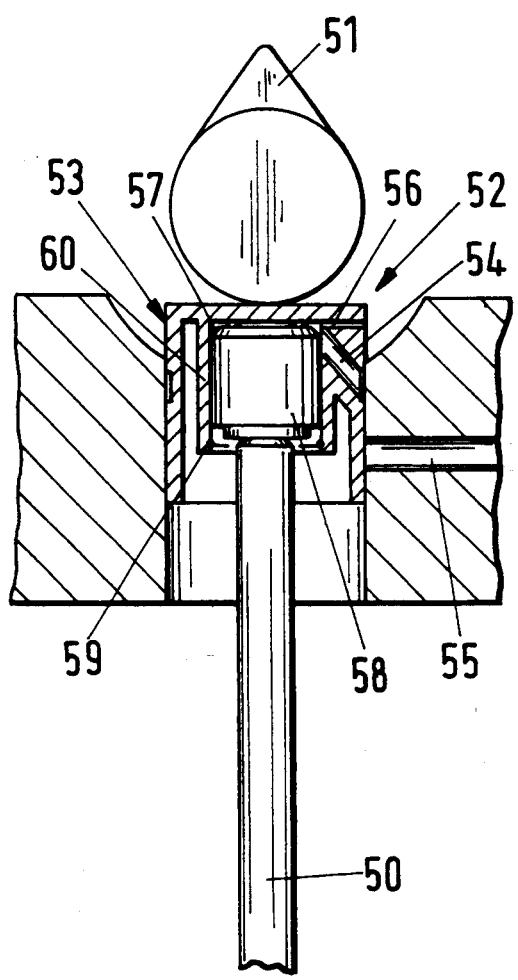
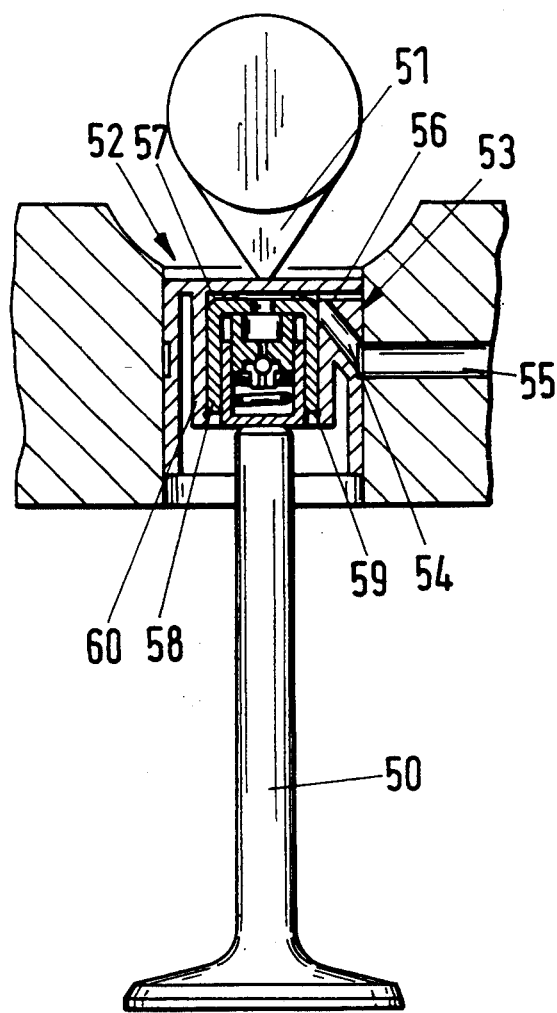

VARIABLE VALVE CONTROL ARRANGEMENT

BACKGROUND OF THE INVENTION

This invention relates to variable control arrangements for valves such as internal combustion engine lift valves.

In internal combustion engines such as those used in motor vehicles, there is often a need to vary the valve open times and the valve lift strokes of the intake and exhaust valves, especially the intake valves, as a function of one or more operating parameters of the engine, such as the engine speed and/or load. German Offenlegungsschrift No. 38 15 668 discloses a variable valve lift arrangement having a hydraulically adjustable coupling assembly consisting of a cup plunger and an inner plunger forming a hydraulic working space and disposed between a valve stem and a valve-actuating cam. In this coupling assembly, a compression spring moves the cup plunger and the inner plunger apart by a maximum distance, providing the maximum lengthwise extent of the hydraulic working space, during the base circle phase of the cam, when the lift valve is closed. At that time, the hydraulic working space is in flow communication with an accumulator for a hydraulic fluid pressure medium. As soon as the cam produces a longitudinal displacement of the cup plunger, the pressure in the working space is increased. Depending on the position of a solenoid valve which provides a flow passage to the accumulator when open, a pressure reduction or limitation occurs in the hydraulic working chamber so that its lengthwise extent, and hence the lengthwise distance between the cup plunger and the inner plunger, is decreased. If the solenoid valve is not actuated, this conventional valve arrangement operates with the maximum stroke of the lift valve and maximum valve open time. By actuating the solenoid valve, the valve stroke and valve open time can be reduced in a controlled manner.

A decisive factor in the operation of this conventional valve arrangement is the function of the solenoid valve, which must be open during the base circle phase of the cam in order to draw the hydraulic fluid from the accumulator into the working space which is then at its maximum volume. The solenoid valve must then close until the exact time when it must open once more to determine the closing time of the lift valve. An especially noticeable disadvantageous feature of this arrangement is that the control of the hydraulic fluid with the solenoid valve affects not only the intake of fluid but also the removal of fluid from the working space. Consequently, in the event of a malfunction of the solenoid valve, the characteristics of the valve control arrangement vary in an unpredictable manner. If the malfunction of the solenoid valve results in a permanent disconnection of the working space from the accumulator after the base circle phase of the cam, i.e., after the working space is completely filled, then the valve will operate continuously with its maximum stroke and maximum opening time. On the other hand, if the malfunction of the solenoid valve manifests itself in keeping the communication between the working space and the accumulator open, then the valve will be actuated with its minimum stroke and shortest opening time. In other words, despite the cost that a solenoid control valve involves, this conventional variable valve fails to provide a valve control arrangement having a defined default behavior.

SUMMARY OF THE INVENTION

Accordingly, it is an object of the present invention to provide a variable valve control arrangement which overcomes the disadvantages of the prior art.

Another object of the invention is to provide a valve control arrangement for a lift valve which will assure a predetermined mode of operation of the lift valve in the event of failure of the control arrangement which applies even if no control valve is provided in the lift valve control arrangement and the pressure of the hydraulic fluid in the inflow is controlled in some other way. For example, the hydraulic fluid pressure may be controlled by providing communication with a lubricating oil system of the internal combustion engine in which the pressure depends on an operating condition of the engine such as engine speed and/or load.

These and other objects of the invention are accomplished by providing a variable valve control arrangement having a coupling assembly between the cam and the valve which includes a cup plunger and an inner plunger forming a hydraulic working space between them and in which the coupling assembly includes a passage connecting the working space with a hydraulic fluid supply line when the valve is actuated by the cam and, depending upon the operating condition of the engine, the pressure of the hydraulic fluid supply may then enlarge the working space to increase the lift of the valve. When the cam is in its base circle phase, on the other hand, a throttle passage in the coupling connects the working space to atmospheric pressure.

Contrary to the above-described prior art, therefore, no filling of the hydraulic working space with pressure medium occurs during the base circle phase of the cam. Instead, the working space is relieved of hydraulic pressure through the throttle passage at that time so that the inner plunger rests mechanically against the bottom of the cup plunger under the action of the valve closing spring. Whereas in the prior art the response of the solenoid valve during the stroke of the lift valve reduces the length of the coupling assembly because communication between the working space and the accumulator is then established, in the case of the present invention, during this stroke, in which the throttle passage is closed, alignment of the hydraulic pressure medium supply and a passage in the cup plunger will cause the cup plunger and the inner plunger to move apart, enlarging the hydraulic working space, provided the pressure of the hydraulic pressure medium is high enough. In other words, the pressure must be high enough that the restoring force of the valve closing spring as well as the forces of acceleration in the valve action are overcome. It will be understood that the acceleration forces may be negative during the range of operation of the crest of the cam.

In contrast to the prior art discussed above, the present invention provides a minimum valve stroke and a minimum duration of valve opening which are determined by mechanical engagement between the inner plunger and the cup plunger and an additional pair of valve stroke and valve opening values hydraulically superimposed on the minimum values in which the form of the valve lift curve in the neighborhood of the closing time of the valve is determined by the properties of at least one throttle passage. Thus, an incorrect retention of a valve associated with the supply of pressure medium to the working space in its closed position merely causes the lift valve to be actuated with its minimum stroke mechanically determined by direct contact between the inner plunger and the cup plunger because the throttle passage releases the pressure in the working space after each valve opening cycle. With the coupling arrangement of the invention, moreover, no pressure control valve is required. Instead, the pressure medium may be supplied without interposition of any control valve by a lubricating oil circuit of an engine in which the oil pressure is increased at high rotational speeds and/or at high load.

BRIEF DESCRIPTION OF THE DRAWINGS

Further objects and advantages of the invention will be apparent from a reading of the following description in conjunction with the accompanying drawings, in which:

FIGS. 3 and 4 are views similar to FIGS. 1 and 2 showing another representative embodiment of the invention;

FIGS. 5 and 6 are views similar to FIGS. 1 and 2 showing a further representative embodiment of the invention.

DESCRIPTION OF PREFERRED EMBODIMENTS

Figure 1:
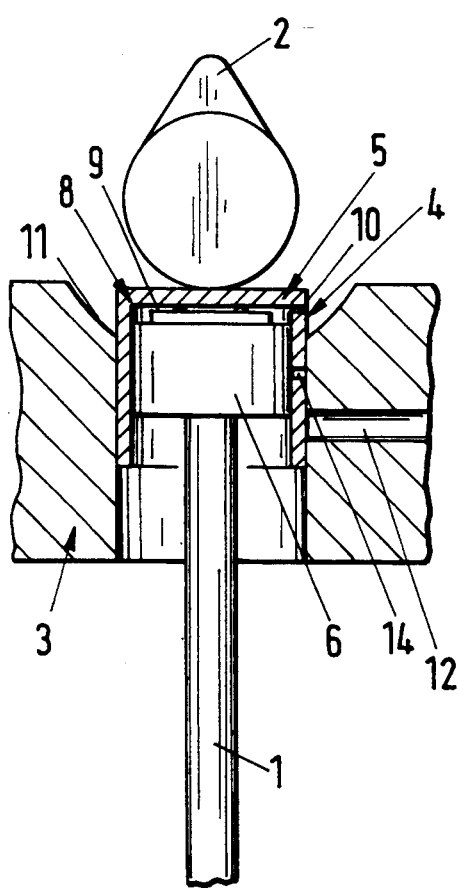
FIGS. 1 and 2 are views in longitudinal section illustrating a representative variable valve control arrangement according to the invention in two positions of the valve-actuating cam.
Figure 2:
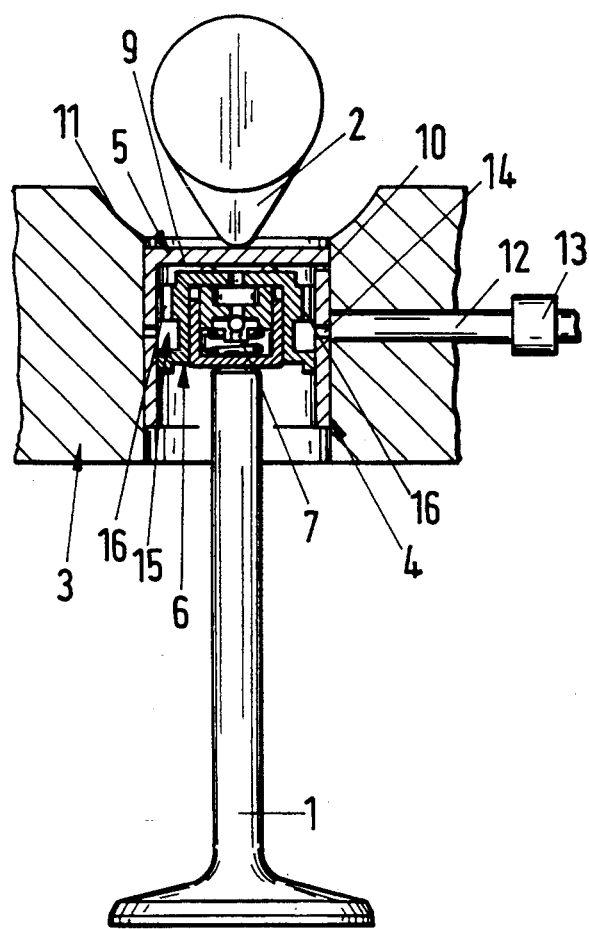

In the typical embodiment shown in FIGS. 1 and 2 by way of example, a lift valve 1, which is urged in the closing direction, i.e., upwardly as viewed in FIGS. 1 and 2, by a conventional closing spring arrangement (not shown), is arranged to be displaced periodically by a rotating cam 2 out of its closed position shown in FIG. 1 into its open position shown in FIG. 2. This takes place through a coupling assembly 4 which is longitudinally displaceable in a cylinder head 3 of an internal combustion engine containing the lift valve. In this embodiment, the coupling assembly 4 consists of an outer cup plunger 5 and an inner plunger 6 which is longitudinally displaceable therein. As shown in FIG. 2, the inner plunger 6 contains a conventional compensating device 7 to compensate for play of the valve 1. Such compensating devices are known and therefore need not be explained herein.

As FIG. 1 shows, when the lift valve 1 is closed, i.e., during the base circle phase of the cam 2, the inner plunger 6 is urged by the valve closing spring against the inner surface of the head 8 at one end of the cup plunger 5. In this condition, a hydraulic working space 9 formed between the cup plunger 5 and the inner plunger 6 has its minimum longitudinal extent and the hydraulic working space 9 is in communication with the atmosphere through at least one throttle passage 10, which is open to a recess 11 on the cam side region of the cylinder head 3 so that it is relieved of pressure.

In this embodiment, a pressure-regulating valve 13, which is not essential to the invention, is included in a pressure medium supply line 12 to control the pressure of a pressure medium supplied to the coupling assembly. Control of the pressure is important for varying the form of the lift curve of the valve. For as soon as the cam 2 has displaced the cup plunger 5 downwardly far enough so that a passage 14 in the cup plunger communicates with the pressure medium supply line 12, pressure medium can flow into the working space 9 and enlarge its longitudinal extent, as shown in FIG. 2, if the pressure in the supply line 12 is high enough. For this to occur, the pressure must be high enough so that the force exerted by the pressure medium on the inner plunger 6 can overcome the sum of the forces of the valve closing spring and acceleration. If the pressure in the supply line 12 is too low for this, the pressure medium will have no effect on the longitudinal extent of the coupling assembly 4 and there will be no modification of the lift curve of the valve 1.

Accordingly, provided that the pressure in the pressure medium supply line 12 is sufficiently high, an increase in the length of the coupling assembly 4 will occur during communication between the passages 12 and 14 but, as soon as a control edge 15 of the inner plunger 6 closes the passage 14, there will be an interruption of the flow communication between the pressure medium supply line 12 and the working space 9. Since the throttle passage 10 also is closed off as the cup plunger moves downwardly in the cylinder head 3, the pressure in the hydraulic working space 9 is maintained during the remainder of the valve cycle until the throttle passage 10 is again exposed to the head recess 11 as shown in FIG. 1, after which the pressure in the working space 9 is reduced at a speed determined by the size of the throttle passage 10.

It will be understood that, in principle, it is also possible to make the opening and closing of the pressure medium supply line 12 to the working space 9 dependent only on the position of the cup plunger 4, i.e., the location of the passage 14 in the head 3.

To provide communication between the passage 14 and the working space 9, another passage 16 is formed in a flange-like portion of the inner plunger 6 which forms the control edge 15.

In the embodiment of FIGS. 3 and 4, there is no corresponding flange-like portion. In this case, a valve 30 is driven by a cam 31 in a cylinder head 32 and a variable-length coupling assembly 33 is provided between the cam and the valve. As in the first embodiment, the coupling assembly comprises an outer cup plunger 34 having a passage 36 which communicates at times with a pressure medium supply line 35 and an inner plunger 37 which is longitudinally displaceable in the cup plunger 34 and against which the valve 30 is urged by its closing spring. The two plungers 34 and 37 form a hydraulic working space 38 between them which is of variable longitudinal extent. During the base circle phase of the cam 31, a throttle passage 40 in the cup plunger 34 is open to a head recess 39 so that the working space 38 is then relieved of pressure.

In this embodiment, the maximum stroke of the lift valve 30 is limited by an annular stop 41 in the cup plunger 34 so that the range of displacement of the inner plunger 37 is limited by stops in both directions, i.e., the stop 41 at the open end of the cup plunger and by the head 42 at the closed end of the cup plunger.

Still another design, having a different form of cup plunger, is shown in FIGS. 5 and 6. In this embodiment, a valve 50 is subject to the mutually opposed forces exerted by a valve closing spring (not shown) and a cam 51. A coupling assembly 52 for adjusting the valve lift and valve-open times includes a cup plunger 53 having a passage 54 for communication with a pressure medium supply 55 and a throttle passage 56 for pressure relief of a hydraulic working space 57 and a longitudinally displaceable inner plunger 58. As in the previous embodiment, the longitudinal displaceability of the inner plunger 58 in the downward direction as seen in the drawings, i.e., the maximum opening stroke of the valve 50, is limited by a stop 59 on the cup plunger 53. To guide the inner plunger 58, the cup plunger in this case includes an inner sleeve 60 extending downwardly from its upper end. This arrangement ensures an especially low oil consumption.

In this embodiment as in the embodiment of FIGS. 3 and 4, no pressure control valve is included in the pressure medium supply 55 since, as mentioned previously, such a valve is not necessary to the operation of the invention.

The operation of the valve control arrangement of the invention will be explained with reference to the graphs of FIGS. 7 and 8.

Figure 7:
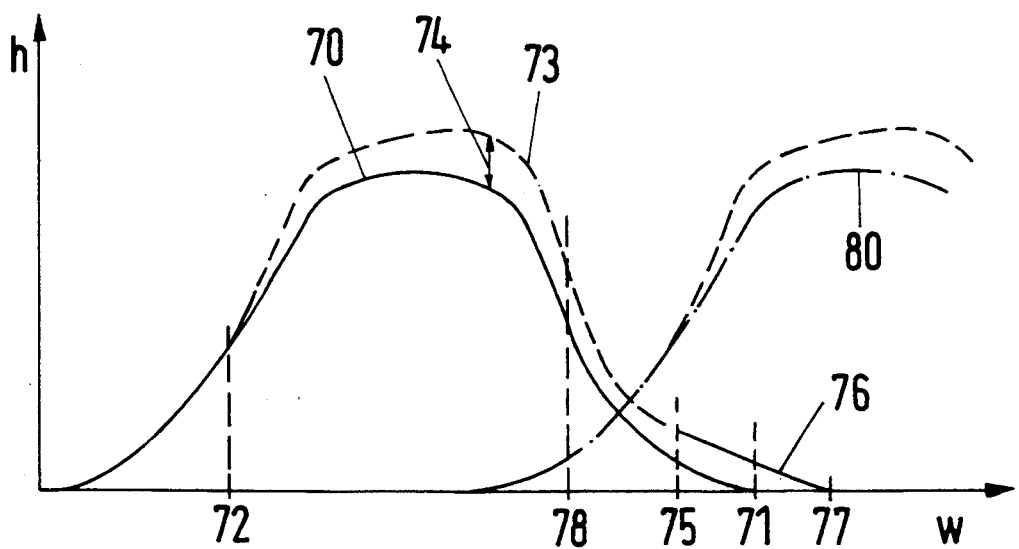
FIGS. 7 and 8 are graphical representations showing valve lift and valve closing force curves plotted against cam angle, respectively.
Figure 8:
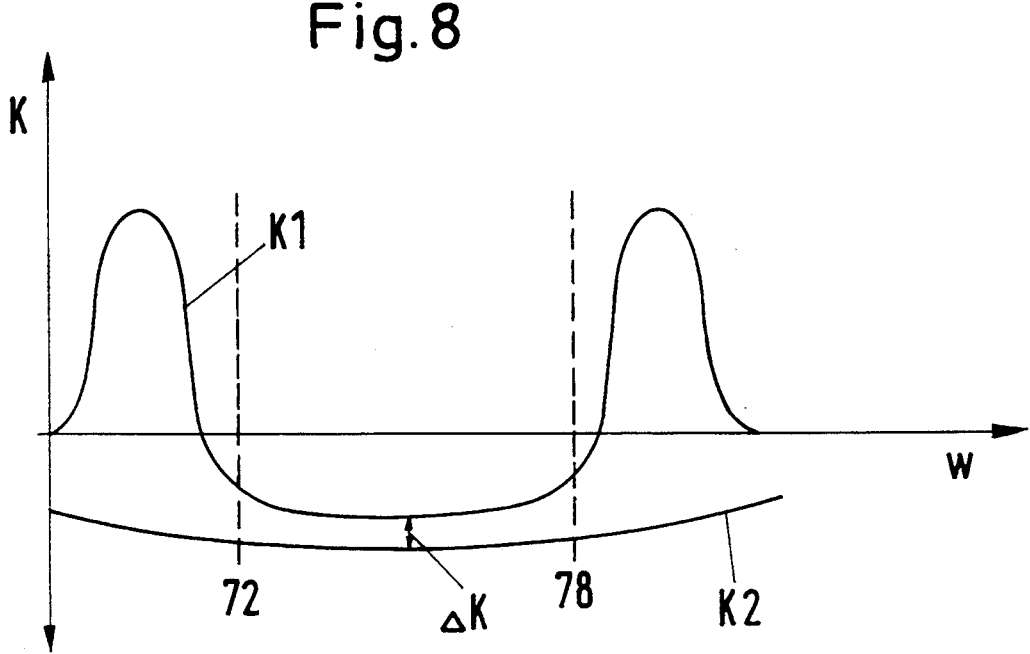

FIG. 7 illustrates the valve position h of the lift valve to be controlled plotted against the cam angle w. As long as the pressure of the pressure medium is not high enough to separate the plungers in the coupling assembly, actuation of the valve takes place by mechanical contact alone, that is, by mechanical abutment of the inner plunger 6 with the head 5 of the cup plunger 4 of FIG. 1, providing a valve lift curve 70. The valve closing time is located at 71 in the graph. When the pressure medium supplied to the working space by the passage marked 12 in FIGS. 1 and 2 during the rising flank of the valve curve at the time (or cam angle) 72 is high enough to separate the plungers, there will be an additional "hydraulic" stroke 74 producing a different valve lift curve 73. This additional stroke 74 is maintained by closing of the pressure system containing the working space 9 until the throttle passage 10 is cleared to provide a pressure relief and a correspondingly slow closing of the lift valve 1 takes place according to the portion 76 of the valve lift curve 73. In this case, the closing time is located at 77. Thus, the open time of the valve has been substantially increased relative to the "mechanical" lift curve 70.

By allowing the communication between the hydraulic working space 9 and the pressure medium supply 12 to persist, it is also possible to extend the maximum stroke phase up to a point 78 located on the descending flank of the valve lift curve 73. This is especially advantageous because, as shown by the curve of force K required to accelerate the masses of the valve action plotted against the cam angle w, this force becomes negative in the neighborhood of the maximum stroke as shown in FIG. 8. In that illustration, the curve of the acceleration force is shown as K1 and the force curve of the valve closing spring is shown as K2. Consequently, it can be seen that, in the region between the times 72 and 78, die pressure of the medium need only generate a comparatively small differential force ΔK.

In a multi-cylinder internal combustion engine having several intake and exhaust valves with variable valve control arrangements of the type described herein, the flank intervals in the valve lift curves should be selected so that there is no overlapping of the lift-increasing phases, i.e. the ranges 72–78 (FIG. 7), of the several valves. The valve lift curve of another valve is indicated at 80 in FIG. 7. In this way, variations in hydraulic fluid pressure resulting from simultaneous application of fluid to several working chambers are avoided.

Returning to the example shown in FIGS. 1 and 2, in which a valve 13 is provided in the pressure medium supply line, it can be seen that, even in the event of failure of this valve, a defined valve stroke for the lift valve 1, i.e., the "mechanical" valve stroke represented by the curve 70, is ensured.

The invention thus provides a variable valve control arrangement constructed in a simple manner which is highly resistant to malfunction.

Although the invention has been described herein with reference to specific embodiments, many modifications and variations therein will readily occur to those skilled in the art. Accordingly, all such variations and modifications are included within the intended scope of the invention.

I claim:

1. A variable valve control arrangement for a lift valve actuated by a cam comprising hydraulically adjustable coupling means interposed between a cam and a lift valve and displaceable therewith, the coupling means comprising an outer cup plunger on the cam side and an inner plunger on the valve side forming a hydraulic working space between them, a pressure medium supply line for supplying a pressure medium under pressure to the working space, the inner plunger and the cup plunger being arranged to interact mechanically during a base circle phase of the cam, a passage in the coupling means providing communication between the working space and the pressure medium supply line only when the coupling means is in positions corresponding to flanks of the valve lift curve so that, when the pressure of the pressure medium is high enough, a lengthwise enlargement of the coupling means takes place to increase the valve stroke, and wherein the working space is associated with at least one additional throttle passage in the coupling means which is open to relieve pressure in the working space only when the coupling means is in various positions corresponding to the base circle phase of the cam and the adjoining valve stroke intervals as the lift valve is moved towards its closed position for retarding the closing motion of the lift valve.

2. A variable valve control arrangement according to claim 1 including a pressure-regulating valve in the pressure medium supply line.

3. A variable valve control arrangement according to claim 1 wherein the pressure medium supply line is supplied with oil as a pressure medium by a lubricating oil circuit of an engine containing the valve control arrangement and the oil pressure therein depends on at least one operating parameter of the engine.

4. A variable valve control arrangement according to claim 1 wherein the working space communicates with the pressure medium supply line also in positions of the coupling means corresponding to the high point of the valve stroke.

5. A variable valve control arrangement according to claim 1 wherein the valve is mounted in a cylinder head and has a throttle passage temporarily communicating with a recess in the cylinder head for relief of pressure in the working space.

6. A variable valve control arrangement according to claim 1 including a device in the inner plunger for compensating for valve play.

7. A variable valve control arrangement according to claim 1 wherein the inner plunger is longitudinally displaceable in the cup plunger between two stops, one of which is provided by a closed end of the cup plunger.

8. A variable valve control arrangement according to claim 1 including a guide sleeve extending from the closed end of the cup plunger and enclosing the inner plunger and the working space.

9. A variable valve control arrangement for an internal combustion engine having a plurality of lift valves with variable valve control arrangements according to claim 1 and wherein the flank intervals in the valve curves are selected so that overlapping of the lift-increasing phases of the several valves is avoided.

* * * * *